(12) United States Patent
Zhao et al.

(10) Patent No.: US 7,550,534 B2
(45) Date of Patent: Jun. 23, 2009

(54) THERMOPLASTIC METHOD, COMPOSITION, AND ARTICLE

(75) Inventors: Xinyu Zhao, Houston, TX (US); Vijay Mhetar, Slingerlands, NY (US); Thomas J. Hartle, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 444 days.

(21) Appl. No.: 11/281,306

(22) Filed: Nov. 16, 2005

(65) Prior Publication Data

US 2007/0112132 A1    May 17, 2007

(51) Int. Cl.
*C08L 53/02* (2006.01)
(52) U.S. Cl. .............................. 525/88; 525/98; 525/99
(58) Field of Classification Search ................... 525/88, 525/98, 99
See application file for complete search history.

(56) References Cited

U.S. PATENT DOCUMENTS

| | | | |
|---|---|---|---|
| 4,690,978 | A | 9/1987 | Jadamus et al. |
| 4,921,762 | A | 5/1990 | Jadamus et al. |
| 4,994,508 | A | 2/1991 | Shiraki et al. |
| 5,100,947 | A | 3/1992 | Puydak et al. |
| 5,153,076 | A | 10/1992 | Jadamus et al. |
| 5,294,654 | A | 3/1994 | Hellstern-Burnell et al. |
| 6,448,327 | B1 | 9/2002 | Braat et al. |
| 6,547,992 | B1 | 4/2003 | Schlosser et al. |
| 6,579,944 | B1 | 6/2003 | Abdou-Sabet et al. |
| 6,627,701 | B2 | 9/2003 | Adedeji et al. |
| 6,737,459 | B2 | 5/2004 | Ebisawa et al. |
| 6,872,777 | B2 | 3/2005 | Adedeji et al. |
| 6,908,964 | B2 | 6/2005 | Adedeji et al. |
| 7,091,267 | B2 * | 8/2006 | Venderbosch et al. ........ 524/154 |
| 7,196,137 | B2 * | 3/2007 | McBride et al. ............... 525/97 |
| 2003/0045638 | A1 | 3/2003 | Qiao et al. |
| 2003/0144415 | A1 | 7/2003 | Wang et al. |
| 2003/0181603 | A1 | 9/2003 | Venderbosch et al. |
| 2004/0170854 | A1 | 9/2004 | Kuo et al. |
| 2005/0075426 | A1 | 4/2005 | Campbell et al. |
| 2005/0154100 | A1 | 7/2005 | Kosaka et al. |
| 2005/0154130 | A1 | 7/2005 | Adedeji et al. |
| 2005/0245679 | A1 | 11/2005 | Ajbani et al. |

FOREIGN PATENT DOCUMENTS

| | | |
|---|---|---|
| EP | 1 564 247 A1 | 8/2005 |
| WO | WO 98/02489 | 1/1998 |
| WO | WO 02/16489 A2 | 2/2002 |
| WO | WO 2005/068549 A1 | 7/2005 |

OTHER PUBLICATIONS

S. Abdou-Sabet, R. C. Puydak and C. P. Rader, Rubber Chemistry and Technology, vol. 69, pp. 276-293, 1996.
JP2002030221A; Jan. 31, 2002; Machine Translation (26 pages).
JP2002307907A; Oct. 23, 2002; Machine Translation (17 pgs).
International Search Report; International Application No. PCT/US2006/044201; International Filing Date Nov. 14, 2006; Date of Mailing Apr. 5, 2007; File Reference O8CN144561 (4 pages).
XP-002426605; JP 2005 105037 A; Apr. 21, 2005; Abstract Only (4 pages).
S. Abdou-Sabet, R. C. Puydak and C. P. Rader, Rubber Chemistry and Technology, vol. 69, pp. 476-494, 1996.
ASTM D638-03 Standard Test Method for Tensile Properties of Plastics (14 pgs), Published Jan. 2004.
ASTM D648-01 Standard Test Method for Deflection Temperature of Plastics Under Flexural Load in the Edgewise Position (12 pgs), Published Oct. 2001.
ASTM D790-03 Standard Test Methods for Flexural Properties of Unreinforced and Reinforced Plastics and Electrical Insulating Materials (11 pgs), Published Apr. 2003.
ASTM D256-04 Standard Test Methods for Determining the Izod Pendulum Impact Resistance of Plastics (20 pgs), Published Jun. 2004.
ASTM D2240-03 Standard Test Method for Rubber Property-Durometer Hardness (11 pgs), Published May 2003.
ASTM D792-00 Standard Test Methods for Density and Specific Gravity (Relative Density) of Plastics by Displacement (6 pgs), Mar. 2001.
ASTM E28-97 Standard Test Methods for Softening Point of Resins by Ring-and-Ball Apparatus (7 pgs), Published Sep. 1997.

* cited by examiner

*Primary Examiner*—Jeffrey C Mullis
(74) *Attorney, Agent, or Firm*—Cantor Colburn LLP

(57) ABSTRACT

A thermoplastic composition includes a poly(arylene ether), a hydrogenated block copolymer, a pre-blend of a thermoplastic vulcanizate and a hydrogenated block copolymer, an ethylene/alpha-olefin copolymer, and a hydrocarbon resin. Pre-blending the thermoplastic vulcanizate with a portion of the hydrogenated block copolymer was found to markedly improve the flame resistance and physical properties of the composition compared to those of compositions in which the thermoplastic vulcanizate and hydrogenated block copolymer are separately added to the final compounding process. Addition of hydrocarbon resin further improves the balance of flame retardancy and physical properties.

13 Claims, 3 Drawing Sheets

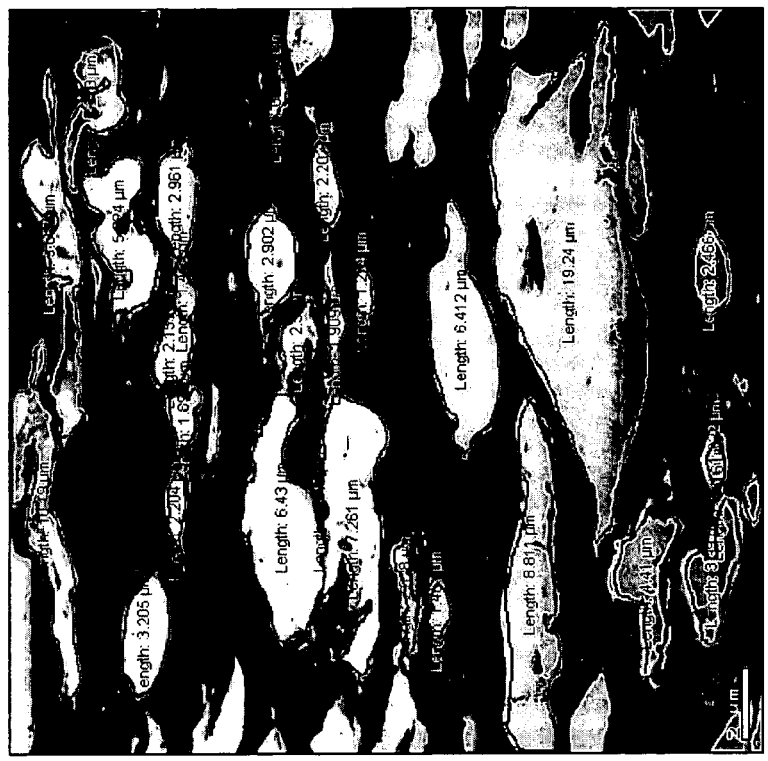
(b)
FIG. 2
(a)

THERMOPLASTIC METHOD, COMPOSITION, AND ARTICLE

BACKGROUND OF THE INVENTION

Polyvinyl chloride resins have long been used as the coating resin in the coated wire and cable industry. However, there is mounting concern over the environmental impact of halogenated materials and non-halogenated alternatives are being sought. Candidate polyethylene compositions have avoided the use of halogenated compounds, but these compositions typically have high levels of inorganic flame retardants that can result in deterioration of some mechanical properties and processability. Candidate poly(arylene ether) compositions, such as those described in U.S. Patent Application Publication No. 2005/0154100 A1 of Kosaka et al., show considerable promise, but there remains a desire for compositions exhibiting improved physical properties while maintaining excellent flame retardancy.

BRIEF DESCRIPTION OF THE INVENTION

The above-described and other drawbacks are alleviated by a method of preparing a thermoplastic composition, comprising: melt kneading a thermoplastic vulcanizate and a first hydrogenated block copolymer of an alkenyl aromatic compound and a conjugated diene to form a vulcanizate-copolymer blend; and melt kneading the vulcanizate-copolymer blend, a poly(arylene ether), and a second hydrogenated block copolymer of an alkenyl aromatic compound and a conjugated diene.

Other embodiments, including a composition prepared by the method and an article comprising the composition, are described in detail below.

BRIEF DESCRIPTION OF THE DRAWINGS

Referring now to the drawings wherein like elements are numbered alike in several FIGURES:

FIG. 2(a) is a photomicrograph of a comparative composition prepared by melt kneading a thermoplastic vulcanizate, a poly(arylene ether), and a hydrogenated block copolymer (without pre-blending thermoplastic vulcanizate and hydrogenated block copolymer); FIG. 2(b) is the same photomicrograph, showing particle size analysis;

DETAILED DESCRIPTION OF THE INVENTION

Figure 1:
FIG. 1 is two photomicrographs, at different magnifications, of a melt-kneading blend of a thermoplastic vulcanizate and a hydrogenated block copolymer.
Figure 1:
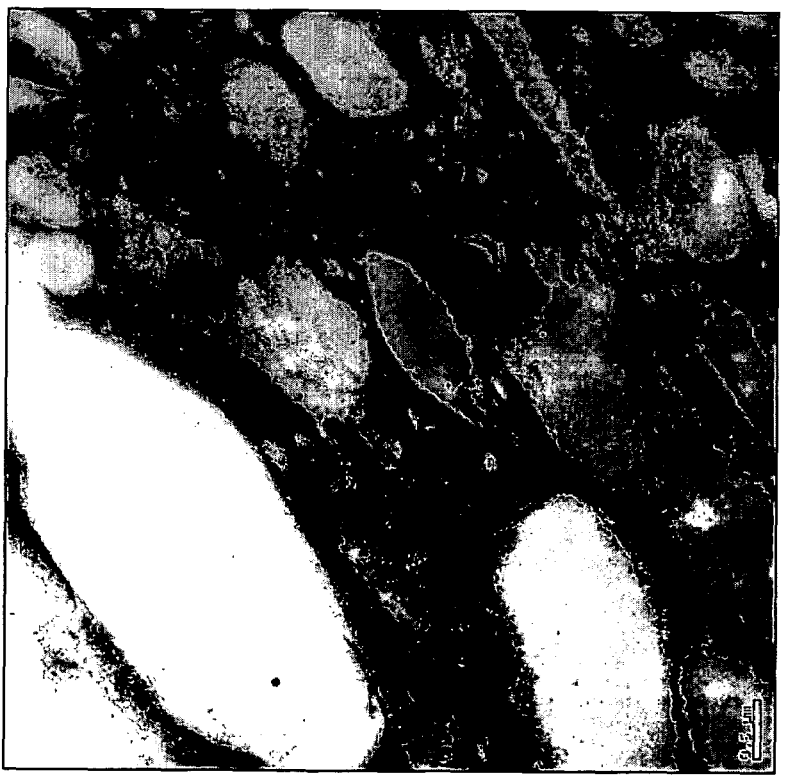

One embodiment is a method of preparing a thermoplastic composition, comprising: melt kneading a thermoplastic vulcanizate and a first hydrogenated block copolymer of an alkenyl aromatic compound and a conjugated diene to form a vulcanizate-copolymer blend; and melt kneading the vulcanizate-copolymer blend, a poly(arylene ether), and a second hydrogenated block copolymer of an alkenyl aromatic compound and a conjugated diene. After extensive formulation and processing investigations, the present inventors have discovered that pre-blending the thermoplastic vulcanizate with a portion of the hydrogenated block copolymer markedly improved the flame resistance and physical properties of the composition compared to those of compositions in which the thermoplastic vulcanizate and hydrogenated block copolymer are added as separate components to a single melt kneading process. The improvement is manifested in objective properties including UL 94 flame out time, tensile strength, tensile elongation, and heat deflection temperature. The present inventors have further discovered that addition of a hydrocarbon resin further improves the composition's balance of flame retardancy and physical properties.

The method comprises melt kneading a thermoplastic vulcanizate and a first hydrogenated block copolymer of an alkenyl aromatic compound and a conjugated diene to form a vulcanizate-copolymer blend. As used herein, the term "melt kneading" generally refers to any thermoplastic melt blending technique capable of producing an intimate blend. Apparatus suitable for preparing thermoplastic blends via melt kneading includes, for example, a two-roll mill, a Banbury mixer, and a single-screw or twin-screw extruder. In one embodiment, melt kneading comprises using a twin-screw extruder. "Thermoplastic vulcanizate", as used herein, refers to a blend comprising a thermoplastic polyolefin and a dynamically partially vulcanized rubber. Thermoplastic vulcanizates and their preparation are described, for example, in S. Abdou-Sabet, R. C. Puydak, and C. P. Rader, *Rubber Chemistry and Technology*, vol. 69, pp. 476-493, 1996. Examples of suitable thermoplastic polyolefins used in the thermoplastic vulcanizate are thermoplastic crystalline and semi-crystalline polyolefin homopolymers and copolymers or combinations thereof. Examples of these are homopolymers of ethylene or propylene, copolymers of ethylene and propylene, copolymers of ethylene and an alpha-olefin with 4-12 carbon atoms, and copolymers of propylene and an alpha-olefin with 4-12 carbon atoms. It is important that the ethylene or propylene content in the copolymers is sufficiently high that the copolymer is semi-crystalline. This is usually achieved at an ethylene or propylene content of about 70 mole percent or more. Preferably, a homopolymer of propylene is used.

Examples of rubbers that can be used in the thermoplastic vulcanizate are rubbers that are suitable for dynamic vulcanization. Examples of such rubbers are ethylene-propylene copolymers, hereinafter called EPM, ethylene-propylene-diene terpolymers, hereinafter called EPDM, styrene butadiene rubber, nitrile butadiene rubber, isobutene-isoprene rubber, styrene-(ethylene-styrene)-butadiene block copolymers, butyl rubber, isobutylene-p-methylstyrene copolymers, brominated isobutylene-p-methylstyrene copolymers, natural rubber, and blends of these. Preferably, EPDM or EPM is used as rubber. Most preferably, EPDM is used as rubber. The EPDM preferably comprises about 50 to about 70 parts by weight ethylene monomer units, about 30 to about 48 parts by weight monomer units originating from an alpha-olefin, and about 2 to about 12 parts by weight monomer units originating from a non-conjugated diene. A preferred alpha-olefin is propylene. Preferred non-conjugated dienes include dicyclopentadiene (DCPD), 5-ethylidene-2-norbornene (ENB), and vinylnorbornene (VNB).

The dynamic vulcanization of the rubber is carried out in the presence of a suitable vulcanization agent such as, for instance, sulfur, sulfurous compounds, metal oxides, maleimides, phenol resins or peroxides. These vulcanization systems are known in the art and are described, for example, in U.S. Pat. No. 5,100,947 to Puydak et al. It is also possible to use a siloxane compound as a vulcanization agent. Examples include hydrosilanes and vinylalkoxysilanes. The degree of vulcanization can be expressed in terms of gel content. Determination of gel content is described in U.S. Pat. No. 5,100,947 to Puydak et al. The rubber in the thermoplastic vulcanizate is at least partly vulcanized and may have a gel content of about 60 to about 100%. More preferably, the rubber has a gel content of about 80 to about 100%. Most preferably, the rubber is fully vulcanized and has a gel content in excess of about 95%.

Thermoplastic vulcanizates are commercially available and may be prepared by published methods. Exemplary thermoplastic vulcanizates include various grades of SANTOPRENE®, available from Monsanto, Kelprox and SARLINK®, available from DSM, and TREFSIN® available from Exxon.

In addition to the thermoplastic vulcanizate, the vulcanizate-copolymer blend comprises a first hydrogenated block copolymer of an alkenyl aromatic compound and a conjugated diene. The first hydrogenated block copolymer (which is pre-blended with the thermoplastic vulcanizate) and the second hydrogenated block copolymer (which is subsequently blended with the vulcanizate-copolymer blend) may be the same or different. Each is a hydrogenated block copolymer of an alkenyl aromatic compound and a conjugated diene (hereinafter referred to as "hydrogenated block copolymer"). A hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having branched chains. In one embodiment, these structures are linear structures including diblock (A-B block), triblock (A-B-A block or B-A-B block), tetrablock (A-B-A-B block), and pentablock (A-B-A-B-A block or B-A-B-A-B block) structures as well as linear structures containing six or more blocks in total of A and B. In one embodiment, they are diblock, triblock, and tetrablock structures, with the A-B diblock and A-B-A triblock structures being particularly preferred.

The alkenyl aromatic compound providing the block (A) is represented by formula

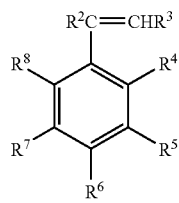

wherein $R^2$ and $R^3$ each independently represent a hydrogen atom, a $C_1$-$C_8$ alkyl group, a $C_2$-$C_8$ alkenyl group, or the like; $R^4$ and $R^8$ each independently represent a hydrogen atom, a $C_1$-$C_8$ alkyl group, a chlorine atom, a bromine atom, or the like; and $R^5$-$R^7$ each independently represent a hydrogen atom, a $C_1$-$C_8$ alkyl group, a $C_2$-$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations thereof. Of these, styrene, alpha-methylstyrene, p-methylstyrene, vinyltoluenes, and vinylxylenes are preferred, with styrene being more preferred. Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the alkenyl aromatic monomer and the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the hydrogenated block copolymer. Suitable alkenyl aromatic content may be about 10 to about 90 weight percent based on the total weight of the hydrogenated block copolymer. Within this range, the alkenyl aromatic content may be at least about 20 weight percent, or at least about 30 weight percent, or at least about 40 weight percent, or at least about 60 weight percent. Also within this range, the alkenyl aromatic content may be up to about 80 weight percent, or up to about 70 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

The hydrogenated block copolymer is preferably hydrogenated to such a degree that less than 20%, yet more preferably less than 10%, of the aliphatic unsaturation in the aliphatic chain moiety derived from the conjugated diene remains unreduced. The aromatic unsaturated bonds derived from the alkenyl aromatic compound may be hydrogenated to a degree of up to about 25%.

The hydrogenated block copolymer preferably may have a number average molecular weight of about 5,000 to about 500,000 atomic mass units (AMU), as determined by gel permeation chromatography (GPC) using polystyrene standards. Within this range, the number average molecular weight may be at least about 10,000 AMU, or at least about 30,000 AMU, or at least about 45,000 AMU. Also within this range, the number average molecular weight may be up to about 300,000 AMU, or up to about 200,000 AMU, or up to about 150,000 AMU. The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min. The hydrogenated block copolymer may have any degree of crystallinity. In view of a balance of mechanical strength of the resulting resin composition, those hydrogenated block copolymers having a melting point of about −40° C. to about 200° C. or having no definite melting point (i.e., having non-crystallinity), as measured according to the above-described technique, are preferred. More preferably, the hydrogenated block copolymers have a melting point of at least about 0° C., yet more preferably at least about 20° C., still more preferably at least about 50° C.

The hydrogenated block copolymer may have any glass transition temperature ($T_g$) ascribed to the hydrogenated conjugated diene polymer chain. From the standpoint of low-temperature impact strength of the resulting resin composition, it preferably has a $T_g$ of up to about 0° C., more preferably up to about −120° C. The glass transition temperature of the copolymer can be measured by the aforesaid DSC method or from the visco-elastic behavior toward temperature change as observed with a mechanical spectrometer.

Preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively. Suitable hydrogenated block copolymers include those commercially available as, for example, KRATON® G1650, G1651, and G1652 available from Kraton Polymers, and TUFTEC® H1041, H1043, H1052, H1062, H1141, and H1272 available from Asahi Chemical.

Hydrogenated block copolymers further include partially hydrogenated block copolymers of an alkenyl aromatic compound and a conjugated diene compound (i.e., a "partially hydrogenated block copolymers"). The partially hydrogenated block copolymer is similar to the hydrogenated block copolymer described above, except that it is preferably hydrogenated so that about 20% to about 80% of the unsaturated bonds in the aliphatic chain moiety derived from the conjugated diene remain unreduced. Within this range, the percentage of unreduced unsaturated bonds may be at least 30%, or at least 35%. Also within this range, the percentage of unreduced unsaturated bonds may be up to about 70%, or up to about 65%. Partially hydrogenated block copolymers include the selectively hydrogenated block copolymers in which the hydrogenation selectively reduces pendant aliphatic unsaturation resulting from 1,2- and 3,4-incorporation of the diene while effecting less reduction of the in-chain aliphatic unsaturation resulting from 1,4-incorporation of the diene. For example, in-chain aliphatic unsaturation may remain at least about 30% unhydrogenated, or at least about 40% unhydrogenated, or at least about 50% unhydrogenated; and pendant aliphatic unsaturation remains up to about 20% unhydrogenated, or about 10% unhydrogenated, or up to about 5% unhydrogenated. In one embodiment, the ratio of the percentage of unhydrogenated in-chain aliphatic unsaturation to the percentage of unhydrogenated pendant aliphatic unsaturation is at least about 2, or at least about 5, or at least about 10.

The partially hydrogenated block copolymer may be synthesized by block polymerization followed by hydrogenation as described, for example, in U.S. Pat. No. 4,994,508 to Shiraki et al. Suitable partially hydrogenated block copolymers include the styrene-(butadiene-butylene)-styrene triblock copolymers commercially available from Asahi Chemical as, for example, TUFTEC® P-series copolymers. Additional description of partially hydrogenated block copolymers may be found in U.S. Pat. No. 6,872,777 B2 to Adedeji et al.

The vulcanizate-copolymer blend may comprise about 50 to about 99 weight percent of the thermoplastic vulcanizate, based on the total weight of the vulcanizate-copolymer blend. Within this range, the thermoplastic vulcanizate amount may be at least about 70 weight percent, or at least about 90 weight percent. Also within this range, the thermoplastic vulcanizate amount may be up to about 98 weight percent, or up to about 96 weight percent. The vulcanizate-copolymer blend may comprise about 1 to about 50 weight percent of the first hydrogenated block copolymer, based on the total weight of the vulcanizate-copolymer blend. Within this range, the first hydrogenated block copolymer amount may be at least about 2 weight percent, or at least about 4 weight percent. Also within this range, the first hydrogenated block copolymer amount may be up to about 30 weight percent, or up to about 10 weight percent.

The total amount of the first hydrogenated block copolymer and the second hydrogenated block copolymer may be about 2 to about 40 weight percent, based on the total weight of the composition. Within this range, the total hydrogenated block copolymer amount may be at least about 5 weight percent, or at least about 8 weight percent. Also within this range, the total hydrogenated block copolymer amount may be up to about 30 weight percent, or up to about 20 weight percent.

The composition may comprise the vulcanizate-copolymer blend in an amount of about 5 to about 60 weight percent, based on the total weight of the composition. Within this range, the vulcanizate-copolymer blend amount may be at least about 10 weight percent, or at least about 15 weight percent. Also within this range, the vulcanizate-copolymer blend amount may be up to about 50 weight percent, or up to about 40 weight percent.

In one embodiment, the vulcanizate-copolymer blend comprises a dispersed phase having a mean particle size, measured along a major axis, of about 0.1 to about 3 micrometers. Within this range, the mean particle size may be at least about 0.2 micrometers, or at least 0.5 micrometers. Also within this range, the mean particle size may be up to about 2 micrometers, or up to about 1 micrometer.

In addition to forming the vulcanizate-copolymer blend, the method comprises melt kneading the vulcanizate-copolymer blend, a poly(arylene ether), and a second hydrogenated block copolymer. The term "poly(arylene ether)" includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether); and the like; and combinations thereof. Poly(arylene ether)s are known polymers comprising a plurality of structural units of the formula:

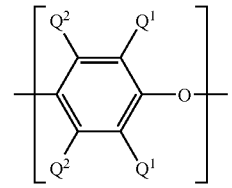

wherein for each structural unit, each $Q^1$ is independently halogen, primary or secondary $C_1$-$C_8$ alkyl, phenyl, $C_1$-$C_8$ haloalkyl, $C_1$-$C_8$ aminoalkyl, $C_1$-$C_8$ hydrocarbonoxy, or $C_2$-$C_8$ halohydrocarbonoxy wherein at least two carbon atoms separate the halogen and oxygen atoms; and each $Q^2$ is independently hydrogen, halogen, primary or secondary $C_1$-$C_8$ alkyl, phenyl, $C_1$-$C_8$ haloalkyl, $C_1$-$C_8$ aminoalkyl, $C_1$-$C_8$ hydrocarbonoxy, or $C_2$-$C_8$ halohydrocarbonoxy wherein at least two carbon atoms separate the halogen and oxygen atoms. Preferably, each $Q^1$ is alkyl or phenyl, especially $C_1$-$C_4$ alkyl, and each $Q^2$ is independently hydrogen or methyl.

Both homopolymer and copolymer poly(arylene ether)s are included. The preferred homopolymers are those comprising 2,6-dimethyl-1,4-phenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles, and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has an initial intrinsic viscosity of about 0.1 to about 0.8 deciliters per gram (dL/g) as measured in chloroform at 25° C. Initial intrinsic viscosity is defined as the intrinsic viscosity of the poly(arylene ether) prior to compounding with the other components of the composition. As understood by one of ordinary skill in the art, the viscosity of the poly(arylene ether) may be up to 30% higher after melt kneading. Within the above range, the initial intrinsic viscosity may be at least about 0.2 dL/g, or at least about 0.3 dL/g. Also within the above range, the initial intrinsic viscosity may be up to about 0.7 dL/g, or up to about 0.6 dL/g. It is possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling. They typically contain at least one heavy metal compound such as a copper, manganese or cobalt compound, usually in combination with nitrogen-containing ligands.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 5 to about 60 weight percent, based on the total weight of the composition. Within this range, the poly(arylene ether) amount may be at least about 10 weight percent, or at least about 20 weight percent, or at least about 30 weight percent. Also within this range, the poly(arylene ether) amount may be up to about 50 weight percent, or up to about 40 weight percent.

The second hydrogenated block copolymer, with which the vulcanizate-copolymer blend and the poly(arylene ether) are blended, is discussed above in the context of the first hydrogenated block copolymer. The second hydrogenated block copolymer may be the same as the first hydrogenated block copolymer. Alternatively, the second hydrogenated block copolymer may be different from the first hydrogenated block copolymer. In one embodiment, the first hydrogenated block copolymer and the second hydrogenated block copolymer each independently comprise a styrene-(ethylene-butylene)-styrene triblock copolymer. The thermoplastic composition may comprise about 1 to about 30 weight percent of the second hydrogenated block copolymer, based on the total weight of the composition. Within this range, the second hydrogenated block copolymer amount may be at least about 2 weight percent, or at least about 5 weight percent. Also within this range, the second hydrogenated block copolymer amount may be up to about 25 weight percent, or up to about 20 weight percent.

In addition to the poly(arylene ether), the hydrogenated copolymer, and the vulcanizate copolymer blend, the composition may, optionally, further comprise a hydrocarbon resin. Examples of hydrocarbon resins include aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof. As used herein, "hydrogenated", when referring to the hydrocarbon resin, includes fully, substantially, and partially hydrogenated resins. Suitable aromatic resins include aromatic modified aliphatic resins, aromatic modified cycloaliphatic resin, and hydrogenated aromatic hydrocarbon resins having an aromatic content of about 1 to about 30%. Any of the above resins may be grafted with an unsaturated ester or anhydride using methods known in the art. Such grafting can provide enhanced properties to the resin. In one embodiment, the hydrocarbon resin in a hydrogenated aromatic hydrocarbon resin.

Suitable hydrocarbon resins are commercially available and include, for example, EMPR 100, 101, 102, 103, 104, 105, 106, 107, 108, 109, 110, 116, 117, and 118 resins, OPPERA® resins, and EMFR resins available from Exxon-Mobil Chemical Company; ARKON® P140, P125, P115, M115, and M135 and SUPER ESTER® rosin esters available from Arakawa Chemical Company of Japan; SYLVARES® polyterpene resins, styrenated terpene resins and terpene phenolic resins available from Arizona Chemical Company; SYLVATAC® and SYLVALITE® rosin esters available from Arizona Chemical Company; NORSOLENE® aliphatic aromatic resins available from Cray Valley; DERTOPHENE® terpene phenolic resins and DERCOLYTE® polyterpene resins available from DRT Chemical Company; EASTOTAC® resins, PICCOTAC® resins, REGALITE® and REGALREZ® hydrogenated cycloaliphatic/aromatic resins available from Eastman Chemical Company; WINGTACK® resins available from Goodyear Chemical Company; PICCOLYTE® and PERMALYN® polyterpene resins, rosins and rosin esters available from Eastman Chemical Company; coumerone/indene resins available from Neville Chemical Company; QUINTONE® acid modified $C_5$ resins, $C_5/C_9$ resins, and acid-modified $C_5/C_9$ resins available from Nippon Zeon; and CLEARON® hydrogenated terpene resins available from Yasuhara. Preferred hydrocarbon resins have softening points of about 80° to about 180° C. Softening point is preferably measured as a ring and ball softening point according to ASTM E28 (Revision 1996).

When the composition comprises the hydrocarbon resin, it may be used in an amount of about 2 to about 40 weight percent, based on the total weight of the composition. Within this range, the hydrocarbon resin amount may be at least about 5 weight percent, or at least about 8 weight percent. Also within this range, the hydrocarbon resin amount may be up to about 30 weight percent, or up to about 20 weight percent.

The composition may, optionally, further comprise one or more additives. Such additives may include, for example, stabilizers, mold release agents, processing aids, flame retardants, drip retardants, nucleating agents, UV blockers, dyes, pigments, reinforcing fillers, particulate fillers (i.e., fillers having an aspect ratio less than about 3), antioxidants, antistatic agents, blowing agents, mineral oil, carbon black, metal deactivators, antiblocking agents, and the like, and combinations thereof. Additives may be added to the composition during formation of the vulcanizate-copolymer blend, during melt kneading of the vulcanizate-copolymer blend, the poly(arylene ether), and the second hydrogenated block copolymer, or both. Suitable flame retardants include, for example, the phosphate ester flame retardants described in U.S. Pat. No. 5,294,654 to Hellstem-Bumell et al. (e.g., resorcinol bis(diphenylphosphate) and bisphenol A bis(diphenylphosphate)), the metallophosphorus flame retardants described in U.S. Pat No. 6,547,992 to Schlosser et al. and U.S. Patent Application Publication No. US 2005/0075426 A1 to Campbell et al. (e.g., aluminum tris(diethylphosphinate)), and the aromatic bisphosphoramidate flame retardants described in U.S. Patent Application Publication No. US 2005/0075426 A1 to Campbell et al.

In one embodiment, the thermoplastic composition comprises a dispersed phase having a mean particle size, measured along a major axis, of about 1 to about 3 micrometers. Within this range, the particle size may be up to about 2.5 micrometers. The present inventors have observed that compositions prepared according to their method include a dispersed phase with particles smaller than those of the dispersed phase of compositions prepared without pre-compounding the thermoplastic vulcanizate with a hydrogenated block copolymer.

One embodiment is a method of preparing a thermoplastic composition, comprising: melt kneading a thermoplastic vulcanizate and a first hydrogenated block copolymer of an alkenyl aromatic compound and a conjugated diene to form a vulcanizate-copolymer blend; and melt kneading the vulcanizate-copolymer blend, a poly(arylene ether), and a second hydrogenated block copolymer of an alkenyl aromatic compound and a conjugated diene; wherein the thermoplastic a crystalline or semi-crystalline thermoplastic polyolefin; and a dynamically partially vulcanized rubber selected from ethylene-propylene copolymers, ethylene-propylene-diene terpolymers, styrene butadiene rubber, nitrile butadiene rubber, isobutene-isoprene rubber, styrene-(ethylene-styrene)-butadiene block copolymers, butyl rubber, isobutylene-p-methylstyrene copolymers, brominated isobutylene-p-methylstyrene copolymers, natural rubber, and combinations thereof; wherein the first hydrogenated block copolymer and the second hydrogenated block copolymer are each independently a styrene-(ethylene-butylene)-styrene triblock copolymer; wherein the poly(arylene ether) comprises 2,6-dimethyl-1,4-phenylene ether units; wherein the vulcanizate-copolymer blend comprises a dispersed phase having a mean particle size, measured along a major axis, of about 0.1 to about 3 micrometers; and wherein the thermoplastic composition comprises a dispersed phase having a mean particle size, measured along a major axis, of about 1 to about 3 micrometers.

One embodiment is a method of preparing a thermoplastic composition, comprising: melt kneading a thermoplastic vulcanizate and a first hydrogenated block copolymer of an alkenyl aromatic compound and a conjugated diene in a weight ratio of about 70:30 to about 98:2 to form a vulcanizate-copolymer blend; and melt kneading about 10 to about 50 weight percent of the vulcanizate-copolymer blend, about 10 to about 50 weight percent of a poly(arylene ether), and about 5 to about 30 weight percent of a second hydrogenated block copolymer of an alkenyl aromatic compound and a conjugated diene; wherein the thermoplastic vulcanizate comprises an ethylene-propylene-ethylidene norbornene terpolymer vulcanizate in a polypropylene matrix; wherein the first hydrogenated block copolymer and the second hydrogenated block copolymer are each independently a styrene-(ethylene-butylene)-styrene triblock copolymer; wherein the poly(arylene ether) comprises 2,6-dimethyl-1,4-phenylene ether units; wherein the vulcanizate-copolymer blend comprises a dispersed phase having a mean particle size, measured along a major axis, of about 0.1 to about 3 micrometers; and wherein the thermoplastic composition comprises a dispersed phase having a mean particle size, measured along a major axis, of about 1 to about 3 micrometers.

One embodiment is a composition prepared according to any of the methods described above. The composition is useful in a variety of product applications that require flexibility, heat resistance, and low cost. For example, the composition is useful for coating wire and cable.

One embodiment is a thermoplastic composition, comprising: (a) a vulcanizate-copolymer blend of (a1) a thermoplastic vulcanizate and (a2) a first hydrogenated block copolymer of an alkenyl aromatic compound and a conjugated diene; wherein the thermoplastic vulcanizate comprises an ethylene-propylene-ethylidene norbornene terpolymer vulcanizate in a polypropylene matrix; wherein the hydrogenated block copolymer comprises a styrene-(ethylene-butylene)-styrene triblock copolymer; and wherein the vulcanizate-copolymer blend comprises a dispersed phase having a mean particle size, measured along a major axis, of about 0.2 to about 2 micrometers; (b) a poly(arylene ether); wherein the poly(arylene ether) comprises a plurality of structural units of the formula

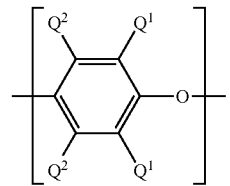

wherein for each structural unit, each $Q^1$ is methyl and each $Q^2$ is independently hydrogen or methyl; and (c) a second hydrogenated block copolymer of an alkenyl aromatic compound and a conjugated diene; wherein the second hydrogenated block copolymer comprises a styrene-(ethylene-butylene)-styrene triblock copolymer.

One embodiment is a thermoplastic composition, comprising: (a) about 5 to about 60 weight percent of a vulcanizate-copolymer blend of (a1) a thermoplastic vulcanizate and (a2) a hydrogenated block copolymer of an alkenyl aromatic compound and a conjugated diene; wherein the thermoplastic vulcanizate comprises an ethylene-propylene-ethylidene norbornene terpolymer vulcanizate in a polypropylene matrix; and wherein the hydrogenated block copolymer comprises a styrene-(ethylene-butylene)-styrene triblock copolymer; and wherein the vulcanizate-copolymer blend comprises a dispersed phase having a mean particle size, measured along a major axis, of about 0.5 to about 2 micrometers; (b) about 10 to about 60 weight percent of a poly(arylene ether); wherein the poly(arylene ether) comprises a plurality of structural units of the formula

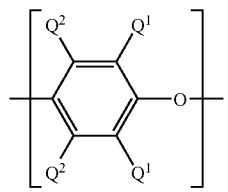

wherein for each structural unit, each $Q^1$ is methyl and each $Q^2$ is independently hydrogen or methyl; (c) a hydrogenated block copolymer of an alkenyl aromatic compound and a conjugated diene; wherein the hydrogenated block copolymer comprises a styrene-(ethylene-butylene)-styrene triblock copolymer; and (d) and about 2 to about 40 weight percent of a hydrocarbon resin; wherein the hydrocarbon resin is a hydrogenated aromatic hydrocarbon resin; wherein the total amount of the first hydrogenated block copolymer and the second hydrogenated block copolymer is about 2 to about 40 weight percent; wherein all weight percents are based on the total weight of the composition; and wherein the composition comprises a dispersed phase having a mean particle size, measured along a major axis, of about 1 to about 3 micrometers.

As illustrated by the working examples below, the composition exhibits a desirable balance of flame retardancy and physical properties. For example, the composition may exhibit one or more of the following properties: a UL 94 rating of V-0 at a thickness of 3.2 millimeters; a tensile strength of about 13 to about 16 megapascals at 25° C., measured according to ASTM D 638; and a tensile elongation at break of about 170 to about 230 percent at 25° C., measured according to ASTM D 638.

The composition is suitable for the formation of articles or components of articles using a variety of molding techniques such as, for example, foam extrusion, single layer and multilayer sheet extrusion, injection molding, blow molding, extrusion, film extrusion, profile extrusion, pultrusion, compression molding, thermoforming, pressure forming, hydroforming, vacuum forming, foam molding, and the like. Thus, one embodiment is an article comprising any of the compositions described herein. The article may include the composition in the form of a film, a sheet, or a molded object or composite that has at least one layer comprising the composition.

As the composition is defined as comprising multiple components, it will be understood that each component is chemically distinct, particularly in the instance that a single chemical compound may satisfy the definition of more than one component.

The invention is further illustrated by the following non-limiting examples.

EXAMPLES 1-8, COMPARATIVE EXAMPLES 1-3

These working examples include variations in the presence or absence of modified thermoplastic vulcanizate, presence or absence of hydrocarbon resin, variations in thermoplastic vulcanizate type, variations in flame retardants, and variations in ethylene copolymers. Compositions are summarized in Table 1, where amounts are reported in parts by weight.

In Table 1, "PPE, IV=0.46" refers to a poly(2,6-dimethyl-1,4-phenylene ether) resin having an initial intrinsic viscosity of 0.46 deciliters per gram, measured in chloroform at 25° C., obtained from General Electric Company. "SEBS, KG1650" refers to a linear styrene-(ethylene-butylene)-styrene triblock copolymer having a styrene content of about 30%, obtained as KRATON® G1650 copolymer from Kraton Polymers. "KELPROX 35 vulcanizate" refers to an ethylene-propylene-ethylidene norbornene terpolymer vulcanizate in a polypropylene matrix, having a Shore A hardness of 35 and a density of 0.90-0.94 grams per cubic centimeter, obtained from DSM. "KELPROX 35+SEBS vulcanizate blend" refers to KELPROX 35 vulcanizate compounded with 5 weight percent KRATON® G1650 triblock polymer. "KELPROX 45 vulcanizate" refers to an ethylene-propylene-ethylidene norbornene terpolymer vulcanizate in a polypropylene matrix, having a Shore A hardness of 45 and a density of 0.94-1.0 grams per cubic centimeter, obtained from DSM. "KELPROX 45+SEBS vulcanizate blend" refers to KELPROX 45 vulcanizate compounded with 5 weight percent KRATON® G1650 triblock copolymer. "VISTALON® 1703 rubber" refers to an ethylene-propylene-ethylidene norbornene terpolymer, obtained from ExxonMobil. "VISTALON® 878 rubber" refers to an ethylene-propylene rubber sold by ExxonMobil. "Mineral Oil" refers to FLEXON 848 mineral oil from Nippon Petro. "ARKON® P125 resin" refers to a hydrogenated aromatic hydrocarbon resin having a softening point of 125° C., obtained from Arakawa Chemical. "Carbon Black" refers to a carbon black having residue on 325 mesh screen of less than 0.03 weight percent, obtained as Regal 660 from Cabot Corporation. "71-B" refers to n-butylated triphenyl phosphate, obtained as PHOSFLEX 71-B phosphate from Akzo Nobel. "RDP" refers to a mixture of resorcinol bis(diphenylphosphate) ester oligomers, obtained as FYROLFLEX RDP oligomers from Akzo Nobel. "BPADP" refers to bisphenol A bis(diphenylphosphate) ester (also known as bisphenol A tetraphenyl diphosphate), obtained as BPA-DP from Great Lakes Chemical.

The "KELPROX 35+SEBS vulcanizate blend" and "KELPROX 45+SEBS vulcanizate blend" components were prepared by melt kneading the corresponding thermoplastic vulcanizates with styrene-(ethylene-butylene)-styrene triblock copolymer in a 30 millimeter intermeshing twin-screw extruder manufactured by Werner & Pfleiderer. The extruder had a ten-barrel configuration with a length to diameter ratio of 32:1. Fiberglass was added downstream into barrel 7, whereas mineral fillers were added to the upstream feed hopper. Compounding conditions were as follows: temperature profile from feed throat to die: 200° C./220° C./240° C./240° C./240° C./240° C.; screw rotation rate 325 RPM; total feed rate 18 kilograms/hour (40 pounds/hour); vacuum vent employed at barrel 10 at a pressure of 85 kilopascals (25 inches of mercury). The compounded composition was pumped through a strand die and pelletized for injection molding. Photomicrographs of the KELPROX 35+SEBS vulcanizate blend at two magnifications are presented in FIGS. 1(a) and 1(b). The lighter, dispersed phase corresponds to thermoplastic vulcanizate, KELPROX 35. The darker, continuous phase corresponds to the styrene-(ethylene-butylene)-styrene block copolymer. In the higher magnification image of FIG. 1(b), it is apparent that the grainy structure of the styrene-(ethylene-butylene)-styrene block copolymer is penetrating the surface of the thermoplastic vulcanizate dispersed phase.

Compositions corresponding to Examples 1-8 and Comparative Examples 1-3 were prepared by melt-blending in a 30 millimeter intermeshing twin-screw extruder manufactured by Werner & Pfleiderer. The extruder had a ten-barrel configuration with a length to diameter ratio of 32:1. Compounding conditions were as follows: temperature profile from feed throat to die: 220° C./240° C./260° C./260° C./260° C./260° C.; screw rotation rate 300 rotations per minute (RPM); total feed rate 18 kilograms/hour (40 pounds/hour); vacuum vent employed at barrel 10 at a pressure of 85 kilopascals (25 inches of mercury). The compounded composition was pumped through a strand die and pelletized for injection molding. Test articles were injection molded on a 120 Ton Van Dorn injection molding machine configured with ASTM test part molds. The temperature of the molding machine barrel was 250° C., and the mold temperature was 60° C. Flexural modulus, flexural stress at yield, and flexural stress at break, all expressed in megapascals, were measured according to ASTM D790 on samples having thickness of 3.2 millimeters. Heat deflection temperature, expressed in ° C., was determined according to ASTM D648 on samples having thickness of 3.2 millimeters. Notched Izod impact strengths were determined according to ASTM D256. Tensile properties were determined according to ASTM D638.

Property values are given in Table 1. "Shore A" refers to the Shore A (durometer) hardness, determined according to ASTM D2240. "UL 94 Rating" refers to the testing result for the Underwriters Laboratory UL 94 test procedure using a sample thickness of 3.2 millimeters. For a V-0 rating, no individual burn times, from the first or second flame application may exceed 10 seconds; the total of the burn times for any five specimens may not exceed 50 seconds; drip particles that ignite a piece of cotton gauze situated below the specimen are not allowed. For a V-1 rating, no individual burn times, from the first or second flame application may exceed 30 seconds; the total of the burn times for any five specimens may not exceed 250 seconds; drip particles that ignite a piece of cotton gauze situated below the specimen are not allowed. For a V-2 rating, no individual burn times, from the first or second flame application may exceed 30 seconds; the total of the burn times for any five specimens may not exceed 250 seconds; drip particles that ignite a piece of cotton gauze situated below the specimen are allowed. Compositions were given a "Fail" rating if they did not meet V-2 criteria. "Flame out time (sec)" refers to the average flame out time per sample in the UL 94 test, expressed in units of seconds. "Tensile strength (MPa)," expressed in units of megapascals, and "Tensile elongation (%)," expressed in units of percent, were measured according to ASTM D 638. "Flexural modulus (MPa)," expressed in units of megapascals, was measured according to ASTM D 790. "Deflection temp (° C.)" refers to heat deflection temperature, expressed in units of degrees centigrade, measured according to ASTM D 648 at 0.455 megapascals.

Figure 3:
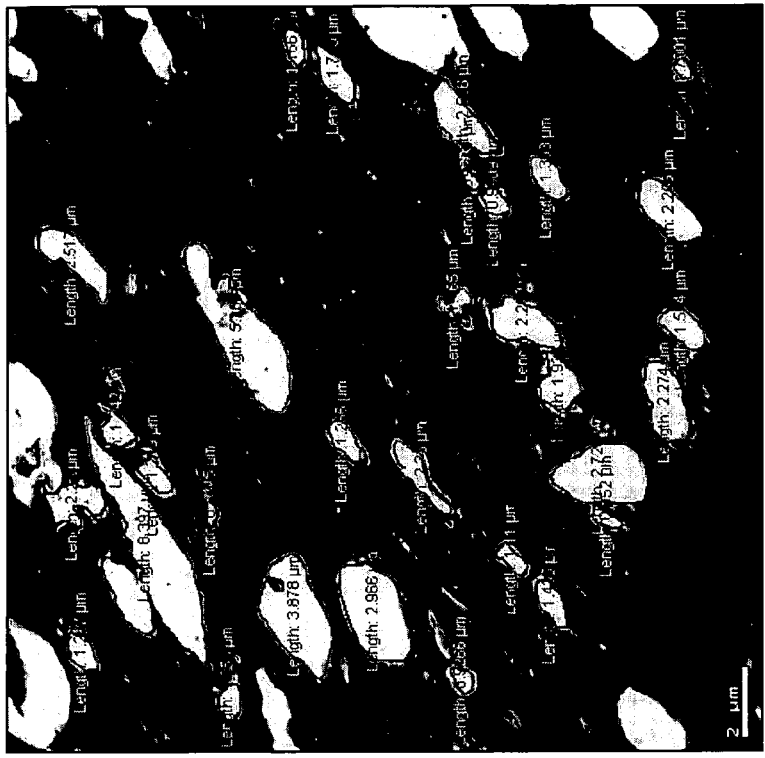
FIG. 3(a) is a photomicrograph of a composition prepared by melt kneading a thermoplastic vulcanizate and a hydrogenated block copolymer to form a vulcanizate-copolymer blend, and melt kneading the vulcanizate-copolymer blend with a poly(arylene ether) and a hydrogenated block copolymer.
FIG. 3(b) is the same photomicrograph, showing particle size analysis.
Figure 3:
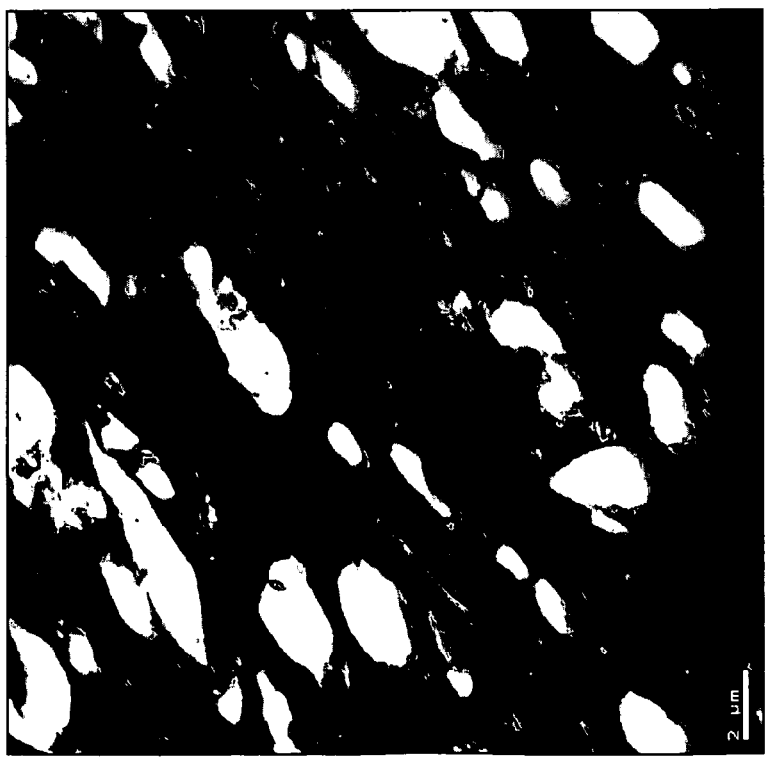

A comparison of Comparative Example 1 and Example 1 illustrates the effect of pre-compounding the thermoplastic vulcanizate with a portion of the hydrogenated copolymer (Ex. 1) versus adding the thermoplastic vulcanizate and the hydrogenated copolymer as separate components during preparation of the total composition (C. Ex. 1). Example 1 exhibited better flame retardancy, tensile strength, tensile elongation, and heat deflection temperature. FIGS. 2 and 3 illustrate the different dispersed phase morphologies of Comparative Example 1 and Example 1, respectively. Within FIGS. 2 and 3, image (a) is the original image, and image (b) shows particle size analysis for the same image. FIG. 2(a) shows that Comparative Example 1 has relatively large, irregularly shaped dispersed phase particles, whereas FIG. 3(a) shows that Example 1 has relatively small, regularly shaped disperse phase particles. Particle size analysis, shown in FIG. 2(b), indicates that Comparative Example 1 has a mean particle size along the major axis of 4.2 micrometers with a standard deviation of 3.9 micrometers, and a median particle size of 2.8 micrometers. Similarly, FIG. 3(b) indicates that Example 1 has a mean particle size along the major axis of 2.0 micrometers with a standard deviation of 1.5 micrometers, and a median particle size of 1.5 micrometers.

A comparison of Comparative Example 2 and Examples 2-4 illustrates the effect of no hydrocarbon resin (C. Ex. 2) versus 10, 12.5, and 15 weight percent hydrocarbon resin (Exs. 2-4, respectively. Addition of the hydrocarbon resin improved flame retardancy, tensile strength, and tensile elongation; i.e., it improved the balance of flame retardancy and physical properties.

A comparison of Comparative Example 3 and Examples 5-8 again illustrates the effect of pre-compounding the thermoplastic vulcanizate with a portion of the hydrogenated copolymer (Exs. 5-8) and further shows that the property advantages associated with that pre-compounding are obtained with a variety of thermoplastic vulcanizate and flame retardant types.

TABLE 1

| COMPOSITION | C. Ex. 1 | Ex. 1 | C. Ex. 2 | Ex. 2 | Ex. 3 | Ex. 4 |
| --- | --- | --- | --- | --- | --- | --- |
| PPE, IV = 0.46 | 35.0 | 35.0 | 34.0 | 34.0 | 34.0 | 34.0 |
| SEBS, KG1650 | 10.0 | 10.0 | 10.0 | 10.0 | 10.0 | 10.0 |
| KELPROX 35 Vulcanizate | 30.0 | — | — | — | — | — |
| KELPROX 35 + SEBS Vulcanizate Blend | — | 30.0 | 27.0 | 21.0 | 19.5 | 18.0 |
| KELPROX 45 + SEBS Vulcanizate Blend | — | — | — | — | — | — |
| VISTALON ® 1703 Rubber | — | — | — | — | — | — |
| VISTALON ® 878 Rubber | — | — | — | — | — | — |
| Mineral Oil | 5.0 | 5.0 | — | — | — | — |
| ARKON ® P125 Hydrocarbon Resin | — | — | — | 10.0 | 12.5 | 15.0 |
| Carbon Black | — | — | — | — | — | — |
| 71-B | 20.0 | 20.0 | — | — | — | — |
| RDP | — | — | 27.0 | 23.0 | 22.0 | 21.0 |
| BPADP | — | — | — | — | — | — |
| PROPERTIES | — | — | — | — | — | — |
| Shore A | 93.2 | 93.4 | 93.6 | 90 | 90.4 | 89.2 |
| UL 94 Rating | Fail | V-2 | V-1 | V-1 | V-0 | V-0 |
| Flame out time (sec) | >60 | 15.8 | 11.8 | 8.4 | 6.4 | 6 |
| Tensile strength (MPa) | 12.8 | 13.5 | 13.7 | 14.4 | 15 | 15.6 |
| Tensile elongation (%) | 165 | 226 | 67 | 115 | 169 | 210 |
| Flexural modulus (MPa) | 294 | 284 | 521 | 377 | 390 | 342 |
| Deflection temp (° C.) | 45.5 | 46.5 | 63.2 | 58.2 | 56.7 | 48.5 |

| COMPOSITION | C. Ex. 3 | Ex. 5 | Ex. 6 | Ex. 7 | Ex. 8 |
| --- | --- | --- | --- | --- | --- |
| PPE, IV = 0.46 | 34.0 | 34.0 | 34.0 | 34.0 | 34.0 |
| SEBS, KG1650 | 10.0 | 10.0 | 10.0 | 10.0 | 10.0 |
| Kelprox 35 | 18.0 | — | — | — | — |

TABLE 1-continued

| | | | | | |
|---|---|---|---|---|---|
| Kelprox 35 + SEBS | — | 18.0 | 18.0 | 18.0 | — |
| Kelprox 45 + SEBS | — | — | — | — | 18.0 |
| VISTALON ® 1703 | — | — | — | — | — |
| VISTALON ® 878 | — | — | — | — | — |
| Mineral Oil | 1.5 | 1.5 | 1.5 | 1.5 | 1.5 |
| ARKON ® P125 | 15.0 | 15.0 | 15.0 | 15.0 | 15.0 |
| Carbon Black | 0.5 | 0.5 | 0.5 | 0.5 | 0.5 |
| 71-B | 21.0 | 21.0 | — | — | — |
| RDP | — | — | 21.0 | — | — |
| BPADP | — | — | — | 21.0 | 21.0 |
| PROPERTIES | | | | | |
| Shore A | 88.1 | 87.7 | 89.2 | 90.4 | 92 |
| UL 94 Rating | Fail | V-1 | V-0 | V-1 | V-1 |
| Flame out time (sec) | 24.2 | 7.7 | 6 | 10.7 | 12 |
| Tensile strength (MPa) | 13.2 | 13.4 | 15.6 | 17.9 | 19.9 |
| Tensile elongation (%) | 159 | 230 | 210 | 210 | 150 |
| Flexural modulus (MPa) | 305 | 284 | 342 | 1230 | 583 |
| Deflection temp (° C.) | 45.8 | 46.3 | 48.5 | 50.4 | 53.4 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All ranges disclosed herein are inclusive of the endpoints, and the endpoints are combinable with each other.

All cited patents, patent applications, and other references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a thermoplastic composition, comprising:

melt kneading a thermoplastic vulcanizate and a first hydrogenated block copolymer of an alkenyl aromatic compound and a conjugated diene to form a vulcanizate-copolymer blend; and melt kneading the vulcanizate-copolymer blend, a poly(arylene ether), and a second hydrogenated block copolymer of an alkenyl aromatic compound and a conjugated diene;

wherein the thermoplastic vulcanizate comprises a crystalline or semi-crystalline thermoplastic polyolefin; and a dynamically partially vulcanized rubber selected from ethylene-propylene copolymers, ethylene-propylene-diene terpolymers, styrene butadiene rubber, nitrile butadiene rubber, isobutene-isoprene rubber, styrene-(ethylene-styrene)-butadiene block copolymers, butyl rubber, isobutylene-p-methylstyrene copolymers, brominated isobutylene-p-methylstyrene copolymers, natural rubber, and combinations thereof;

wherein the first hydrogenated block copolymer and the second hydrogenated block copolymer are each independently a styrene-(ethylene-butylene)-styrene triblock copolymer;

wherein the poly(arylene ether) comprises 2,6-dimethyl-1,4-phenylene ether units;

wherein the vulcanizate-copolymer blend comprises a dispersed phase having a mean particle size, measured along a major axis, of about 0.1 to about 3 micrometers; and wherein the thermoplastic composition comprises a dispersed phase having a mean particle size, measured along a major axis, of about 1 to about 3 micrometers.

2. A method of preparing a thermoplastic composition, comprising:

melt kneading a thermoplastic vulcanizate and a first hydrogenated block copolymer of an alkenyl aromatic compound and a conjugated diene in a weight ratio of about 70:30 to about 98:2 to form a vulcanizate-copolymer blend; and melt kneading about 10 to about 50 weight percent of the vulcanizate-copolymer blend, about 10 to about 50 weight percent of a poly(arylene ether), and about 5 to about 30 weight percent of a second hydrogenated block copolymer of an alkenyl aromatic compound and a conjugated diene;

wherein the thermoplastic vulcanizate comprises an ethylene-propylene-ethylidene norbornene terpolymer vulcanizate in a polypropylene matrix;

wherein the first hydrogenated block copolymer and the second hydrogenated block copolymer are each independently a styrene-(ethylene-butylene)-styrene triblock copolymer;

wherein the poly(arylene ether) comprises 2,6-dimethyl-1,4-phenylene ether units;

wherein the vulcanizate-copolymer blend comprises a dispersed phase having a mean particle size, measured along a major axis, of about 0.1 to about 3 micrometers;

wherein the thermoplastic composition comprises a dispersed phase having a mean particle size, measured along a major axis, of about 1 to about 3 micrometers; and wherein all weight percents are based on the total weight of the composition.

3. The method of claim 2, further comprising melt kneading about 5 to about 30 weight percent of a hydrocarbon resin with the vulcanizate-copolymer blend, the poly(arylene ether), and the second hydrogenated block copolymer; wherein the hydrocarbon resin is a hydrogenated aromatic hydrocarbon resin.

4. A thermoplastic composition prepared according to the method of claim 1.

5. A thermoplastic composition prepared according to the method of claim 2.

6. The composition of claim 5, exhibiting a UL 94 rating of V-0 at a thickness of 3.2 millimeters.

7. The composition of claim 5, exhibiting a tensile strength of about 13 to about 16 megaPascals at 25° C., measured according to ASTM D638.

8. The composition of claim 5, exhibiting a tensile elongation at break of about 170 to about 230 percent at 25° C., measured according to ASTM D638.

9. A thermoplastic composition, comprising a blended mixture of:

(a) about 5 to about 60 weight percent of a vulcanizate-copolymer blend of (a1) a thermoplastic vulcanizate and (a2) a hydrogenated block copolymer of an alkenyl aromatic compound and a conjugated diene; wherein the thermoplastic vulcanizate comprises an ethylene-propylene-ethylidene norbornene terpolymer vulcanizate in a polypropylene matrix; and wherein the hydrogenated block copolymer comprises a styrene-(ethylene-butylene)-styrene triblock copolymer; and wherein the vulcanizate-copolymer blend comprises a dispersed phase having a mean particle size, measured along a major axis, of about 0.5 to about 2.0 micrometers;

(b) about 10 to about 60 weight percent of a poly(arylene ether); wherein the poly(arylene ether) comprises a plurality of structural units of the formula

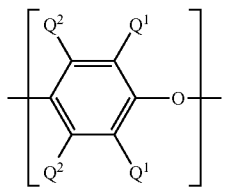

wherein for each structural unit, each $Q^1$ is methyl and each $Q^2$ is independently hydrogen or methyl;

(c) a hydrogenated block copolymer of an alkenyl aromatic compound and a conjugated diene; wherein the hydrogenated block copolymer comprises a styrene-(ethylene-butylene)-styrene triblock copolymer that was not part of the vulcanizate-copolymer blend; and (d) and about 2 to about 40 weight percent of a hydrocarbon resin; wherein the hydrocarbon resin is a hydrogenated aromatic hydrocarbon resin;

wherein the total amount of the first hydrogenated block copolymer and the second hydrogenated block copolymer is about 2 to about 40 weight percent;

wherein all weight percents are based on the total weight of the composition; and wherein the composition comprises a dispersed phase having a mean particle size, measured along a major axis, of about 1 to about 3 micrometers.

10. An article comprising the composition of claim 4.
11. An article comprising the composition of claim 5.
12. An article comprising the composition of claim 9.
13. A thermoplastic composition, comprising a blended mixture of:

(a) about 5 to about 60 weight percent of a vulcanizate-copolymer blend of (a1) a thermoplastic vulcanizate and (a2) a hydrogenated block copolymer of an alkenyl aromatic compound and a conjugated diene; wherein the thermoplastic vulcanizate comprises an ethylene-propylene-ethylidene norbornene terpolymer vulcanizate in a polypropylene matrix; and wherein the hydrogenated block copolymer comprises a styrene-(ethylene-butylene)-styrene triblock copolymer; and wherein the vulcanizate-copolymer blend comprises a dispersed phase having a mean particle size, measured along a major axis, of about 0.5 to about 2.0 micrometers;

(b) about 10 to about 60 weight percent of a poly(arylene ether); wherein the poly(arylene ether) comprises a plurality of structural units of the formula

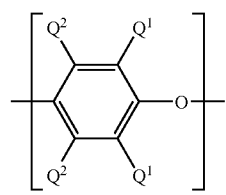

wherein for each structural unit, each $Q^1$ is methyl and each $Q^2$ is independently hydrogen or methyl;

(c) a hydrogenated block copolymer of an alkenyl aromatic compound and a conjugated diene; wherein the hydrogenated block copolymer comprises a styrene-(ethylene-butylene)-styrene triblock copolymer that was not part of the vulcanizate-copolymer blend; and (d) and about 2 to about 40 weight percent of a hydrocarbon resin; wherein the hydrocarbon resin is a hydrogenated aromatic hydrocarbon resin;

wherein the total amount of the first hydrogenated block copolymer and the second hydrogenated block copolymer is about 2 to about 40 weight percent;

wherein all weight percents are based on the total weight of the composition; and wherein the composition comprises a dispersed phase having a mean particle size, measured along a major axis, of about 1 to about 3 micrometers;

wherein the composition exhibits one or more of the following properties: a UL 94 rating of V-0 at a thickness of 3.2 millimeters; a tensile strength of about 13 to about 16 megaPascals at 25° C., measured according to ASTM D 638;and a tensile elongation at break of about 170 to about 230 percent at 25° C., measured according to ASTM D 638.

* * * * *